United States Patent [19]

De Fazio

[11] Patent Number: 4,480,918

[45] Date of Patent: Nov. 6, 1984

[54] NON-CONTACT DISPLACEMENT SENSING SYSTEM FOR A COMPLIANCE DEVICE

[75] Inventor: Thomas L. De Fazio, Watertown, Mass.

[73] Assignee: The Charles Stark Draper Laboratory, Inc., Cambridge, Mass.

[21] Appl. No.: 354,807

[22] Filed: Mar. 4, 1982

[51] Int. Cl.³ .............................................. G01B 5/25
[52] U.S. Cl. .................... 356/373; 356/138; 356/154; 356/375; 33/169 C
[58] Field of Search ............. 356/138, 153, 154, 375, 356/399, 400, 372, 373, 150; 33/169 R, 169 C

[56] References Cited

U.S. PATENT DOCUMENTS

| | | | |
|---|---|---|---|
| 3,333,504 | 8/1967 | Jones et al. | 356/399 |
| 3,583,815 | 6/1971 | Kersey | 356/155 |
| 3,649,122 | 3/1972 | Holtz | 356/399 |
| 3,657,792 | 4/1972 | Hug et al. | 356/154 |
| 3,695,767 | 10/1972 | George et al. | 356/138 |
| 3,723,013 | 3/1973 | Stirland et al. | 356/400 |
| 4,316,329 | 2/1982 | Watson | 33/169 C |
| 4,391,520 | 7/1983 | Ziegel | 356/154 |

Primary Examiner—R. A. Rosenberger
Attorney, Agent, or Firm—Joseph S. Iandiorio

[57] ABSTRACT

A non-contact displacement sensing system for a remote center compliance (RCC) device having a movable part and a fixed part, including: a curved reflector mounted for movement with one part of the RCC device; radiation source means, including at least one radiation source, mounted to the other part of the RCC device and spaced from the curved reflector for providing a beam of radiation to the reflector; and detector means including at least one detector device mounted to the other part of the RCC device and spaced from the curved reflector for receiving the reflected radiation from the radiation source means and generating outputs representative of the displacement of the suspended part relative to the fixed part.

21 Claims, 17 Drawing Figures

NON-CONTACT DISPLACEMENT SENSING SYSTEM FOR A COMPLIANCE DEVICE

FIELD OF INVENTION

This invention relates to a non-contact displacement sensing system for a compliant device having at least two degrees of freedom such as a remote center compliance (RCC) device.

BACKGROUND OF INVENTION

It is often desirable or necessary to measure the displacement of the suspended part of a compliance device relative to the fixed portion of the compliance device, such as is often desired with respect to remote center compliance (RCC) devices.

Remote center compliance (RCC) devices, which are passively compliant, are available for assembly, mating and insertion tasks where it is desired to quickly and easily accommodate for relatively small misalignments. Four different types of RCC devices are disclosed in U.S. Pat. Nos. 4,098,001, 4,155,169, application Ser. No. 140,768, filed Apr. 16, 1980, and application Ser. No. 312,513, filed Oct. 16, 1981, incorporated herein by reference. These devices have now been instrumented, so that, as well as passively adjust to assemble misaligned parts, they now are also able to indicate a measure of the misalignment.

Displacements of interest include translational displacements $\Delta X$, $\Delta Y$, of the operator member along two mutually perpendicular axes x, y, which are also perpendicular to the axis of the operator member, and rotational displacement $\Delta \theta_x$, $\Delta \theta_y$, about the x and y axes.

One technique for the instrumentation of RCC devices for displacement measurement is disclosed in U.S. patent application Ser. Nos. 76,906 and 76,907, filed Sept. 19, 1979, incorporated herein by reference. In such an approach, portions of the detector circuits are mounted on the suspended part, which may include an operator member, and thus are subject to shock loads encountered by the suspended part. Further, the wires or other connection devices used to interconnect the detector circuits on the suspended part with external components must be light and flexible and carefully routed and mounted to avoid interference with the RCC device. Such connection means are subject to breakage and fatique because of the motion of the parts. Separately, since the displacements to be measured are often quite small and there is no mechanical advantage or amplification available inherent in the structure, all of the substantial required amplification must be provided from electronic amplification.

In addition, in such contemporary solutions a coordinate transformation is used which involves sums or differences of the output of the detectors for each desired output, e.g. $\Delta \theta_x$, $\Delta \theta_y$, $\Delta X$, $\Delta Y$. This transformation combined with the discrete nature of the individual detectors results in relatively low angular and displacement resolution.

SUMMARY OF INVENTION

It is therefore an object of this invention to provide an improved, simpler, more accurate non-contact displacement sensing system for a compliant device having at least two degrees of freedom, such as an RCC device.

It is a further object of this invention to provide such a non-contact displacement sensing system having higher angular and translational displacement resolution.

It is a further object of this invention to provide such a non-contact displacement sensing system requiring simpler transformation techniques which provide the $\Delta \theta_x$ and $\Delta \theta_y$ displacements directly from the detectors and in more simplified constructions also provide X and Y displacements directly from the detectors.

It is a further object of this invention to provide such a non-contact displacement sensing system which provides mechanical or optical amplification.

It is a further object of this invention to provide such a non-contact displacement sensing system in which all of the active components requiring interconnection are mounted on fixed portions while only passive components are carried on the moving parts.

The invention results from the realization that an extremely effective, highly accurate displacement measuring system for a compliant device having a movable part and a fixed part and having at least two degrees of freedom, such as an RCC device, can be made using a radiation source and detector mounted on one part and mounting on the other part only a passive component, a curved reflector whose motion varies the angle of incidence of the radiation and varies the interaction of the reflected radiation with the detector.

This invention features a non-contact displacement sensing system for a compliant device having at least two degrees of freedom, such as a remote center compliance (RCC) device, having a fixed part and a movable part which may include an operator member. There is a curved reflector mounted for movement with one part of the RCC device. There are radiation source means including at least one radiation source mounted to the other part of the RCC device and spaced from the curved reflector for providing a beam of radiation to the reflector. The detector means includes at least one detector device mounted to the other part of the RCC device and spaced from the curved reflector, for receiving the reflected radiation from the radiation source means and generating outputs representative of the displacement of the movable part of the RCC relative to the fixed part.

In a preferred embodiment, either the reflector may be mounted to the movable part and the radiation source and detection device may be mounted to the fixed part, or the reflector may be attached to the fixed part and the radiation source and detector device may be attached to the movable part. There may be a detector device corresponding to each radiation source. Each detector device and its corresponding radiation source may be spaced from each other or may be coaxial with each other. Each radiation source may include means for producing a narrow beam of radiation, a collimated beam of radiation, or a planar beam of radiation. Each detector device may include a linear sensor array, two or more linear sensor arrays arranged transversely to one another, or an areal array. The detector device may be monotonically sensitive in one or two directions. In addition, the system may include means for transforming the outputs of each detector device into one or more rotational and translational displacements.

The detector means may generate four outputs representative of the displacement of the movable part of the RCC device relative to the fixed part, and further may include means for transforming two of the outputs of the detector means directly into the rotational displacement about two mutually perpendicular axes which are perpendicular to the axis of the RCC device. When a radiation source and detector aare coaxially arranged, the other two outputs of the detector means may be transformed directly into translational displacement along each of those two mutually perpendicular axes.

DISCLOSURE OF PREFERRED EMBODIMENT

Other objects, features and advantages will occur from the following description of a preferred embodiment and the accompanying drawings, in which.

The invention may be accomplished in a specific non-contact displacement sensing system for a remote center compliance (RCC) device. There is a fixed part or frame, and means carried by the fixed part or frame for providing translational and rotational motion about a remote center of compliance, all of which are typical parts of a conventional RCC device, and a movable or suspended part which may include an operator member supported by the means for providing that translational and rotational motion. A curved, typically cylindrical, reflecting surface is mounted for movement with the one of the parts of the RCC device. It may be a separate reflector fixed to the suspended part of the RCC, or it may be a portion of the movable part of the RCC made curved or cylindrical and polished to provide the necessary reflector characteristics. The curved or cylindrical reflector need not surround the operator member; it is sufficient if there is a curved or cylindrical reflector surface in the area needed to receive a radiation beam and reflect it to a detector. Radiation source means including at least one radiation source are mounted to the fixed portion or frame of the RCC device and spaced from the curved or cylindrical reflector to provide a beam of radiation to the reflector. The beam may take various forms, e.g., collimated, uncollimated, planar. The radiation source means may include one or a number of radiation sources. There are detector means including at least one detector device corresponding to each radiation source. The detector devices are mounted to the fixed portion or frame of the RCC device and are spaced from the curved or cylindrical reflector for receiving the reflected radiation from the radiation source means. The detector means generates outputs representative of the displacement of the suspended part of the RCC relative to the fixed portion or frame.

The detector means responds to the radiation source means by generating outputs representative of the displacement of the suspended or movable part of the RCC relative to the fixed portion or frame. Typically, the detector means provide four outputs. This may be done using four one-dimensional detector devices cooperating with four radiation sources, or by using two two-dimensional detector devices cooperating with two radiation sources. When the detector devices and their associated radiation sources are spaced from one another, two of the four outputs $\theta_x$, $\theta_y$, may be converted directly to represent displacements of the operator member. When the detector devices are coaxially located with their corresponding radiation sources, then all four of the measured outputs may be converted directly to represent displacements of the operator member $\theta_x$, $\theta_y$, X, Y.

Figures 1, 2A, 2B:
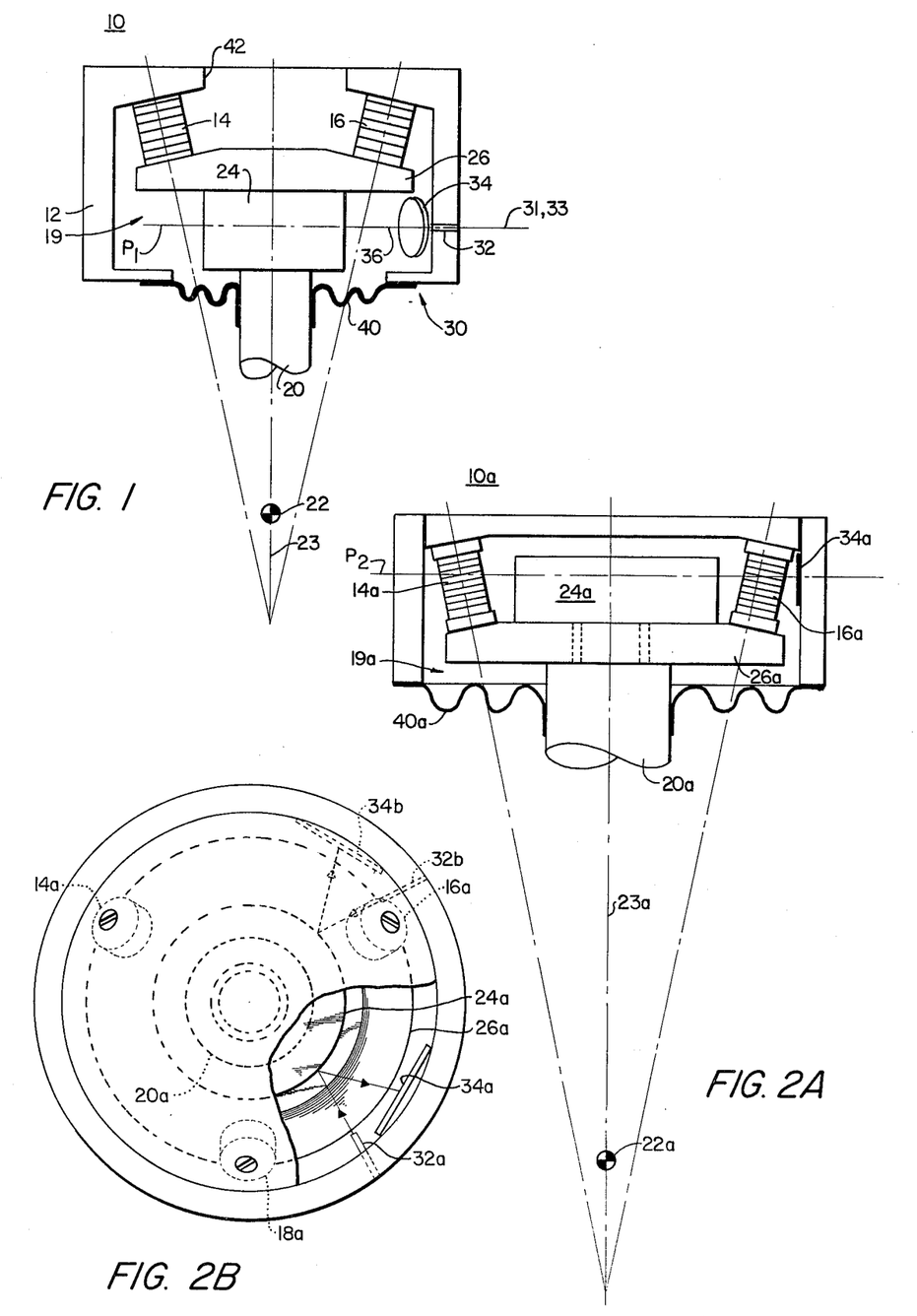
FIG. 1 is a diagrammatic side elevational view of a remote center compliance (RCC) device incorporating the non-contact displacement sensing system of this invention.
FIG. 2A is a view similar to FIG. 1 of another RCC device using a system according to this invention which uses two detector devices and radiation sources.
FIG. 2B is a plan view of FIG. 2A with portions broken away.

There is shown in FIG. 1 an RCC device 10 including a frame 12 which supports three members 14 and 16 (18 not shown) formed of rubber and metal laminations for providing rotational and translational motion about remote center of compliance 22 of movable or suspended part 19, which includes operator member 20. Movable part 19 has an enlarged upper portion the surface of which forms cylindrical reflector 24 and is attached to members 14, 16 and 18 by intermediate plate 26. The non-contact displacement sensor system 30 of this invention includes radiation source means, light source 32, and detector 34, mounted to frame 12 with their optical axes in the same plane, spaced from one another circumferentially about cylindrical reflector 24 so that light beam 36 from radiation source means, light source 32, is reflected by cylindrical surface 24 back to detector means, detector device 34. Conversely, light source 32 and detector 34 may be mounted to movable member 19 and reflector 24 may be attached to frame 12. Light source 32 and detector 34 have their optical axes 31 and 33, respectively, in the same plane, plane P1, which is perpendicular to the axis 23 of the RCC and member 20. A flexible annular seal 40 is attached to the lower portion of frame 12 and surrounds operator member 20 to exclude stray light. A similar light seal may be used to cover hole 42 if it is not sufficiently sealed by mounting to a robot arm or other part.

Although in FIG. 1 the radiation source means and detector means are shown as including but one light source and one detector device, respectively, this is not a necessary limitation of the invention. For example, in FIG. 2A operator member 20a is connected directly to plate 26a without the intervening enlarged portion. Instead, cylindrical surface 24a is mounted on top of plate 26a; the radiation source means includes two light sources 32a, 32b, FIG. 2B; and the detection means includes two detector devices 34a and 34b.

Figure 3:
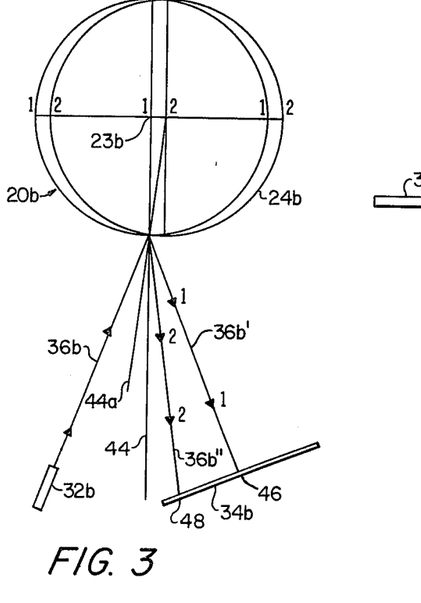
FIG. 3 is a diagrammatic plan view through an operator member illustrating the displacement of the reflected beam on the detector due to displacement of the operator member.
Figure 4:
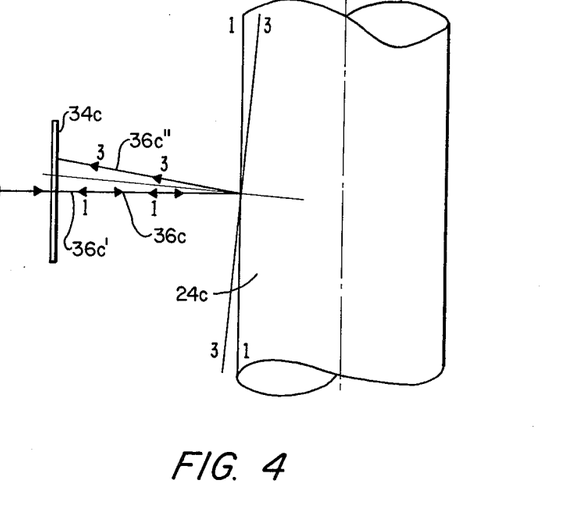
FIG. 4 is a side elevational view of a portion of an operator member illustrating displacement of the reflected beam as a result of rotation of the operator member about a horizontal axis.

Basically, the non-contact displacement sensing system of the invention illustrated in FIGS. 1, 2A and 2B operates as shown in FIGS. 3 and 4. In FIG. 3, cylindrical mirror 24b has shifted laterally from position 1 to position 2. Light source 32b directs a beam of light 36b at cylindrical surface 24b at an angle to normal 44. The light is reflected, as at 36b', along the path indicated by the numbers 1, to strike detector 34b. However, when operator member 20b shifts to position 2, cylindrical surface 24b is shifted also, so that the normal to that surface now becomes as 44a, and the reflected beam 36b" is identified by the numbers 2. A change in position of the beam from point 46 to point 48 on detector 34b provides an output which is representative of the displacement of operator member 20b. Beams 36b, 36b', and 36b" may be in or may be parallel to planes P1 or P2 in FIGS. 1, 2A and 2B.

FIG. 4 illustrates the effect in the vertical plane of the rotation of cylindrical mirror 24c about a horizontal axis. Normally, beam 36c is directed toward, and beam 36c' returns from, mirror 24c along the path indicated by the numbers 1. However, rotations of member 20c and mirror 24c displace beam 36c" to return along the path indicated by the numbers 3. This shift in the location of the beam striking detector 34c provides an output that represents the displacement of suspended part 19c including operator member 20c and mirror 24c.

Figure 5:
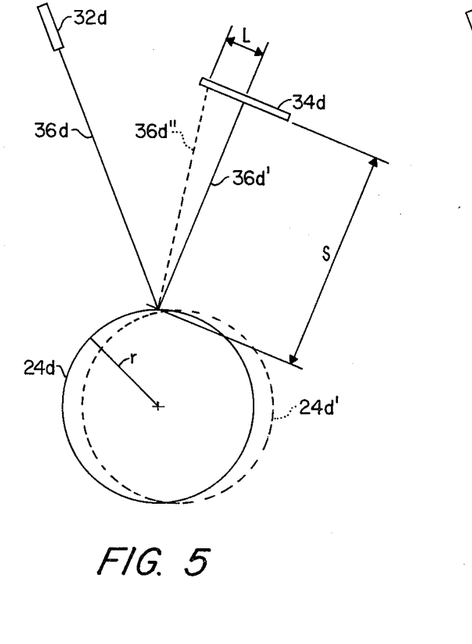
FIGS. 5 and 6 are diagrammatic plan views illustrating the increased beam response obtained with smaller radius cylindrical reflectors.
Figure 6:
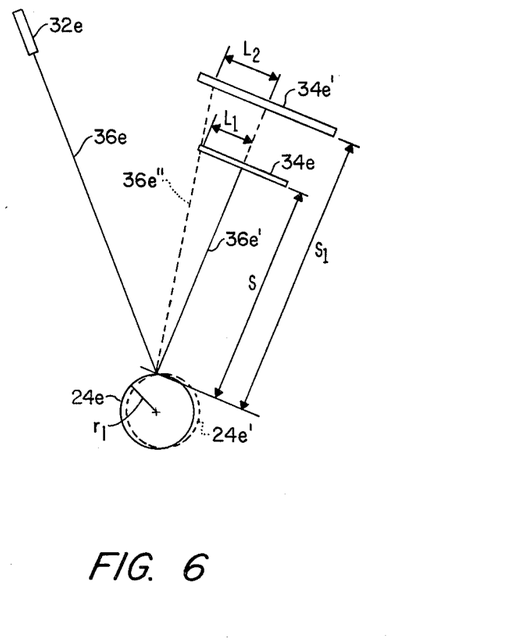

If the displacements to be measured are very small, an initial amplification can be achieved mechanically, optically, by decreasing the radius of the cylindrical surface or increasing the distance between the cylindrical surface and the detector device, as illustrated in FIGS. 5 and 6. In FIG. 5 cylindrical mirror 24d having a relatively large radius r, receives light beam 36d from light source 32d and reflects it as beam 36d' to detector 34d at a distance S from the cylindrical mirror 24d, where beam 36d is reflected. The slight movement of the cylindrical surface so that it occupies the position shown in dashed lines indicated at 24d' results in a shifting of the beam to the position indicated at 36d". Thus beam 36d" has been shifted a distance L, which will be detected as representative of the operator member. However, if the cylindrical surface is reduced to a smaller size, such as indicated by cylindrical surface 24e, FIG. 6, having a much smaller radius $r_1$, the same shift of the cylindrical surface 24e to 24e' results in a much greater distance $L_1$ between the impact point of beam 36e' and 36e" on detector 34e. Amplification can also be gained by increasing the distance between cylindrical surface 24e and the detector. For example, in FIG. 6 the distance between cylindrical surface 24e and detector 34e is shown as S. If that distance is increased to $S_1$ so that detector 34e' is much farther distant from cylindrical surface 24e, then it can be seen that the distance between the point of impact of beams 36e' and 36e" is substantially increased to the distance $L_2$. The description with respect to FIGS. 5 and 6 is strictly illustrative and is not meant to depict actual conditions or scales.

Figures 7, 8:
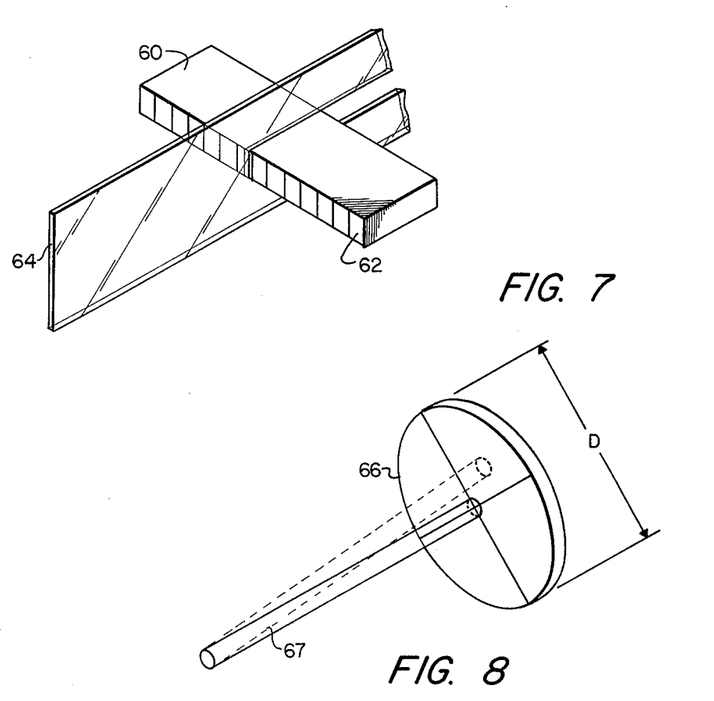
FIG. 7 is a axonometric view of a linear array detector.
FIG. 8 is an axonometric view of an areal array detector which is continuously sensitive in two directions.
Figure 9:
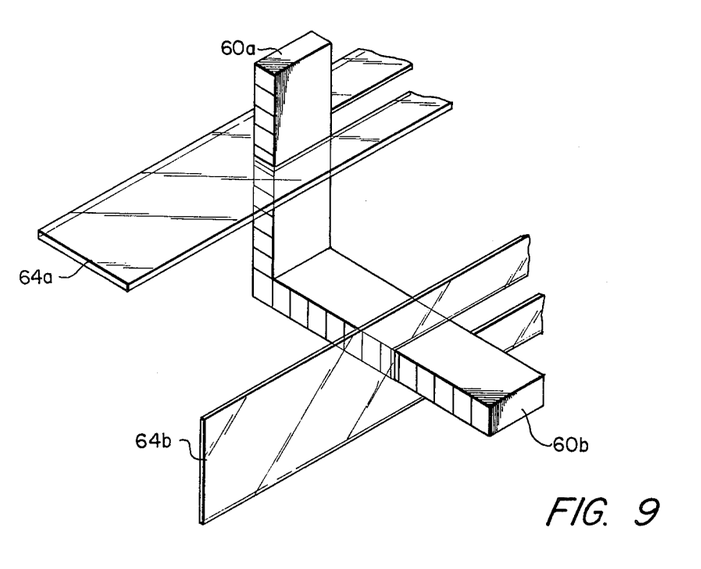
FIG. 9 is an axonometric view of two linear array detectors similar to that shown in FIG. 7, arranged in transverse configuration.
Figure 10:
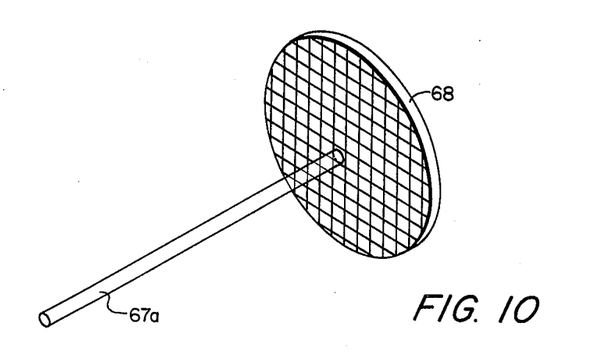
FIG. 10 is another areal array detector using a monolithic "mosaic" detector.

Various types of sensors may be used as the detector devices in the detector means of this invention. In FIG. 7 there is shown a Reticon type linear array detector 60 which provides a digital output in response to motion of the beam in one dimension along its face 62. Preferably, the light source corresponding to this detector device provides a sheet of light 64, which may be plane collimated. There may also be used a Quantrad or a UDT type detector, such as shown in detector device 66, FIG. 8, which is sensitive continuously in two directions in response to a narrow beam 67 of light, preferably collimated and preferably significantly smaller than the diameter of the detector itself. Two or more detector devices 60a and 60b, FIG. 9, similar to the Reticon type 60 shown in FIG. 7 may be mounted transversely to each other to provide sensing in two dimensions. Such detectors may also be of a mosaic configuration to provide a full-area two-dimensional detector device 68, FIG. 10. Detector 68 may use a collimated or uncollimated beam; the former is preferred.

Figure 11:
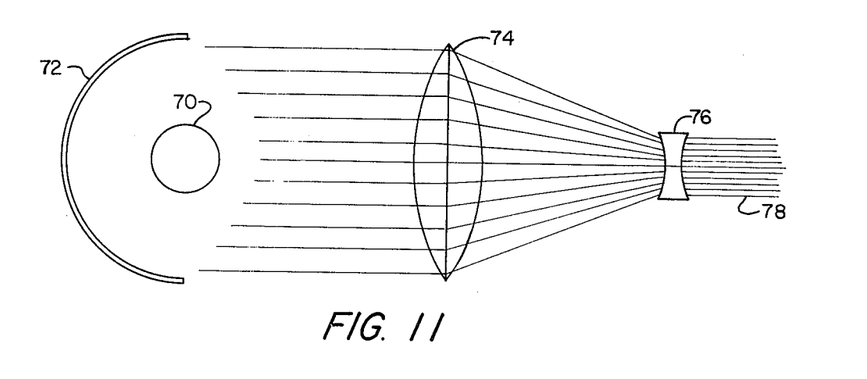
FIG. 11 is a diagrammatic view of one optical system for providing a collimated beam of light.
Figure 12:
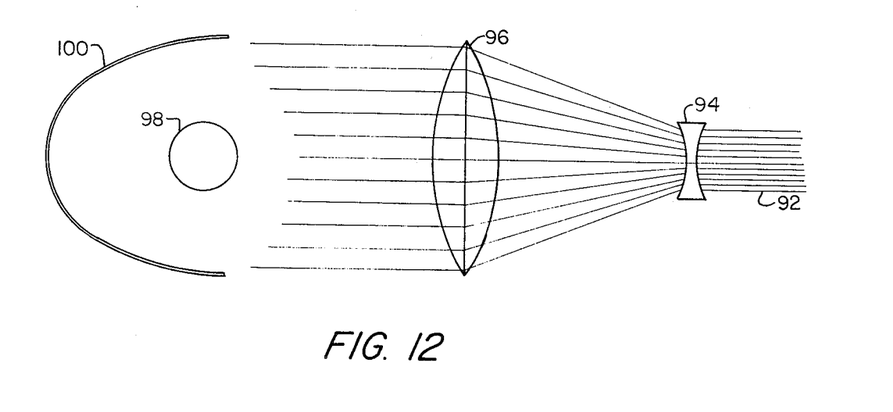
FIG. 12 is a schematic view of an alternative optical system for obtaining a planar beam of light.
Figure 13:
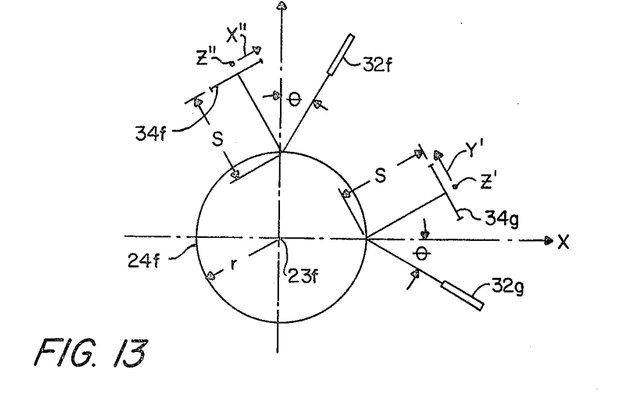
FIG. 13 is a diagram showing the relationship of the various parameters involved in transforming measured outputs from detectors directly into desired displacements.

A beam of collimated light may be provided by spherical light source 70, FIG. 11, mounted in reflector 72. The focusing lens 74 has a collimating lens 76 that provides the final collimated beam 78. Alternatively, a sheet of light or planar beam 92, FIG. 12, may be provided through elongate collimating lens 94 and focusing lens 96, illuminated by a long, tubular light source 98 placed in an elongate reflector 100 having a parabolic cross section. The measurement of the displacement of cylindrical mirror 24f, FIG. 13, is shown using detector means which includes two two-dimensional detector devices 34f and 34g, which cooperate with radiation means which include two radiation sources 32f and 32g. Detector device 34f senses motion in the z" and x" directions. Detector device 34g senses motion in the z' and y' directions. Detector devices 34f and 34g are at distance S from cylindrical surface 24f, which has a radius of r. The angle of incidence of the beam of light from radiation sources 32f and 32g is $\theta$. Thus the four outputs $\Delta x''$, $\Delta y'$, $\Delta z'$, $\Delta z''$, may be expressed as follows:

$$\Delta x'' = (2 \sin \theta) \Delta y - (s/r)\Delta x - \frac{\sin \theta}{r} \Delta x^2 \quad (1)$$

$$\Delta y' = - (2 \sin \theta) \Delta x - (s/r)\Delta y + \frac{\sin \theta}{r} \Delta y^2 \quad (2)$$

$$\Delta z' = -2s \Delta \theta_y \quad (3)$$

$$\Delta z'' = 2s \Delta \theta_x \quad (4)$$

These equations may be approximately expressed in matrix form as follows:

$$\begin{bmatrix} \Delta x'' \\ \Delta y' \\ \Delta z' \\ \Delta z'' \end{bmatrix} = \begin{bmatrix} -s/r & 2\sin\theta & & \\ -2\sin\theta & -(s/r) & & \\ & & & -2s \\ & & 2s & \end{bmatrix} \times \begin{bmatrix} \Delta x \\ \Delta y \\ \Delta \theta_x \\ \Delta \theta_y \end{bmatrix}$$

An inversion of that matrix expression yields $$\begin{bmatrix} \Delta x \\ \Delta y \\ \Delta \theta_x \\ \Delta \theta_y \end{bmatrix} = \begin{bmatrix} \frac{-s/r}{(s/r + 2\sin\theta)(s/r - 2\sin\theta)} & \frac{2\sin\theta}{(s/r + 2\sin\theta)(s/r - 2\sin\theta)} & & \\ \frac{-2\sin\theta}{(s/r + 2\sin\theta)(s/r - 2\sin\theta)} & \frac{-s/r}{(s/r + 2\sin\theta)(s/r - 2\sin\theta)} & & \\ & & \tfrac{1}{2}s & \\ & & & -\tfrac{1}{2}s \end{bmatrix} \begin{bmatrix} \Delta x'' \\ \Delta y' \\ \Delta z' \\ \Delta z'' \end{bmatrix}$$

Figure 14:
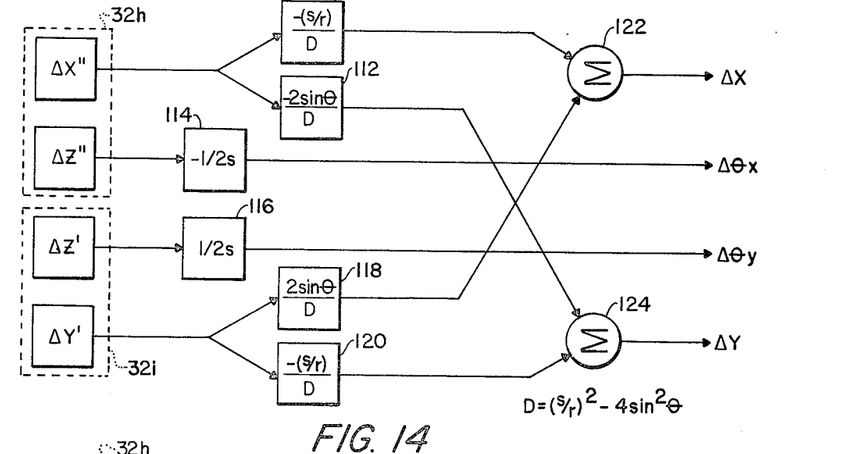
FIG. 14 is a block diagram of a circuit for transforming measured outputs of the detectors into the desired displacement values.

Thus an improved and simpler circuit can be used to transform measured outputs into the displacements $\Delta x$, $\Delta y$, $\Delta \theta x$ and $\Delta \theta y$. For example, for the general case where the detector device and radiation source are spaced from one another, detectors 32h, 32i, FIG. 14, provide four outputs $\Delta x''$, $\Delta z''$, $\Delta z'$, and $\Delta y'$, which are fed to six multipliers 110, 112, 114, 116, 118 and 120. The output $\Delta x''$ is fed to multipliers 110 and 112, where it is multiplied by $$\frac{-(s/r)}{D} \text{ and } \frac{-2\sin\theta}{D},$$

respectively, where $D = (s/r)^2 - 4\sin^2\theta$. Output $\Delta z''$ is fed to multiplier 114, where it is multiplied by $-\tfrac{1}{2}s$. Output $z'$ is fed to multiplier 116, where it is multiplied by $\tfrac{1}{2}s$. Output $y'$ is fed to multipliers 118 and 120, where it is multiplied by $$\frac{2\sin\theta}{D} \text{ and } \frac{-(s/r)}{D},$$

respectively. The outputs of multipliers 110 and 118 are delivered to summing circuit 122, whose output directly provides displacement $\Delta x$. The outputs of multipliers 112 and 120 are combined in summing circuit 124, whose output directly provides displacement $\Delta y$. The output of multiplier 114 directly provides displacement $\Delta \theta_x$, and the output from multiplier 116 directly provides the displacement $\Delta \theta_y$.

Figure 15:
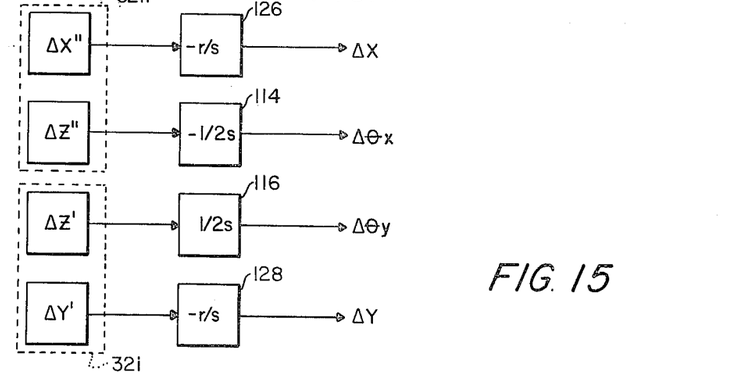
FIG. 15 is a view of an alternative circuit similar to FIG. 14, useful when the radiation means or detector means are arranged in a particular geometry.

In FIG. 15 there is shown a transformation system which is even more simplified than that shown in FIG. 14, and which can be used when the detector device and radiation source are coaxial, such as for example where there is a hole provided in the center of the detector device through which the output of the radiation source can pass. In such a case, multipliers 110 and 112, 118 and 120 are eliminated and replaced by simple multipliers 126 and 128. The $\Delta z''$ and $\Delta z'$ outputs are multiplied by multipliers 114 and 116 to directly provide $\Delta \theta_x$ and $\Delta \theta_y$ as in the disclosure of FIG. 15. In addition, output $\Delta x''$ is multiplied by $-r/s$ in multiplier 126 to directly provide displacement $\Delta x$, and output $\Delta y'$ is multiplied by $-r/s$ in multiplier 128 to directly provide displacement $\Delta y$.

Figure 16:
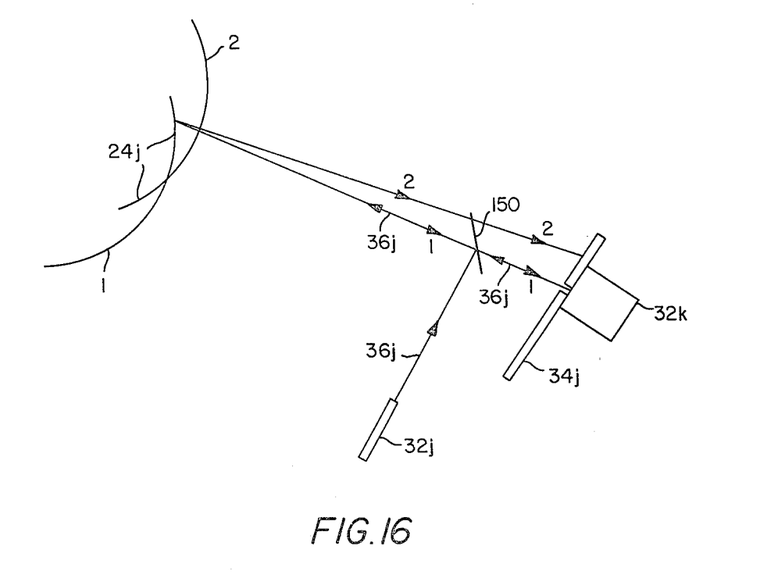
FIG. 16 is a diagrammatic view illustrating a coaxial source of radiation and detector.

The radiation source and detector may be coaxial as shown in FIG. 16. Source 32j provides a beam 36j which is reflected by beam splitting lens 150 to engage reflector 24j. Alternatively, beam 36j may be produced by a source 32k located behind detector 34j. Beam 36j is projected through a very narrow opening 37 in detector 36j. In each case, a reflected beam 1 is reflected from reflector 24j in position 1 and a reflected beam 2 is reflected from reflector 24j in position 2.

The reflected beams are transmitted through beam splitting lens 150 (if provided) and detected by detector 34j so that the heretofore described measurements may be made. When a highly collimated beam 36j is employed the reflected beam 1 passes through opening 37 and detector 34j detects no reflected beam, thereby indirectly indicating that the reflector 24j (and associated operator member) has not moved. Reflected beam 2 is sensed by detector 34j and thereby indicates the degree of movement.

When a less collimated beam is employed, the periphery or fringe of the reflected beam may be directly detected peripherally about opening 37.

Other embodiments will occur to those skilled in the art and are within the following claims:

What is claimed is:

1. A non-contact displacement sensing system for a remote center compliance (RCC) device having a movable part and a fixed part comprising:
   a curved reflector mounted for movement with one of said parts of the RCC device;
   radiation source means including at least one radiation source mounted to the other said part of the RCC device and spaced from said curved reflector for providing a beam of radiation to said reflector; and
   detector means including at least one detector device mounted to said other part of the RCC device and spaced from said curved reflector for receiving the reflected radiation from said radiation source means, and generating output representative of the displacement of the movable part of the RCC device relative to the fixed part.

2. The non-contact displacement sensing system of claim 1 in which said detector device and said radiation source are spaced from each other.

3. The non-contact displacement sensing system of claim 2 in which said detector means generates four outputs representative of the displacement of the operator member relative to the frame and further including means for transforming two of the outputs of said detector means directly into rotational displacement about two mutually perpendicular axes which are perpendicular to the axis of symmetry of the RCC.

4. The non-contact displacement sensing system of claim 1 in which said detector device and said radiation source are coaxial.

5. The non-contact displacement sensing system of claim 4 in which said detector means generates four outputs representative of the displacement of the movable part of the RCC device relative to the fixed part and further including means for transforming two of the outputs of said detector means directly into rotational displacement about two mutually perpendicular axes which are perpendicular to the axis of symmetry of the RCC device and the other two outputs of said detector means directly into translational displacement along each of those two mutually perpendicular axes.

6. The non-contact displacement sensing system of claim 1 in which said radiation source includes means for producing a narrow beam of radiation.

7. The non-contact displacement sensing system of claim 6 in which said radiation source includes means for producing a collimated beam of radiation.

8. The non-contact displacement sensing system of claim 1 in which said radiation source includes means for producing a planar beam of radiation.

9. The non-contact displacement sensing system of claim 1 in which said detector device includes a linear sensor array.

10. The non-contact displacement sensing system of claim 1 in which said detector device includes an areal array.

11. The non-contact displacement sensing system of claim 1 in which said detector device is monotonically sensitive in two directions.

12. The non-contact displacement sensing system of claim 1 in which said detector device includes a pair of mutually perpendicular linear arrays.

13. The non-contact displacement sensing system of claim 1 further including means for transforming the outputs of each said detector device into one or more rotational and translational displacements.

14. The non-contact displacement sensing system of claim 1 in which said curved reflector is cylindrical.

15. The non-contact displacement sensing system of claim 1 in which said reflector is mounted on said movable part and said radiation source means and said detector means are mounted on said fixed part.

16. The non-contact displacement sensing system of claim 1 in which there is a detector device corresponding to each said radiation source.

17. A non-contact displacement sensing system for a remote center compliance (RCC) device having a movable part and a fixed part comprising:
a curved reflector mounted for movement with one of said parts of the RCC device;
radiation source means mounted to the other of said parts of the RCC device and spaced from said curved reflector for providing a beam of radiation to said reflector;
detector means, spaced from said radiation source means, mounted to said other part of the RCC device and spaced from said curved reflector for receiving the reflected radiation from said radiation source means, and generating four outputs representative of the displacement of the movable part of the RCC device relative to the fixed part; and
means for transforming two of the four outputs of said detector means directly into rotational displacement of the movable part of the RCC device relative to the fixed part about two mutually perpendicular axes perpendicular to the axis of symmetry of the RCC device.

18. A non-contact displacement sensing system for a remote center compliance (RCC) device having a movable part and a fixed part comprising:
a curved reflector mounted for movement with one of said parts of the RCC device;
radiation source means mounted to the other of said parts of the RCC device and spaced from said curved reflector for providing a beam of radiation to said reflector;
detector means, coaxial with said radiation source means, mounted to said other part of the RCC device and spaced from said curved reflector for receiving the reflected radiation from said radiation source means, and generating four outputs representative of the displacement of the movable part of the RCC device relative to the fixed part; and
means for transforming two of the four outputs of said detector means directly into rotational displacement of the movable part of the RCC device relative to the fixed part about two mutually perpendicular axes perpendicular to the axis of the symmetry of the RCC device, and the other two outputs of said detector means directly into translational displacements of the operator member relative to the fixed part along the mutually perpendicular axes.

19. A non-contact displacement sensing system for a compliant device having a movable part and a fixed part and at least two degrees of freedom comprising:
a curved reflector mounted for movement with one of said parts of the compliant device;
radiation source means including at least one radiation source mounted to the other said part of the compliant device and spaced from said curved reflector for providing a beam of radiation to said reflector; and
detector means including at least one detector device mounted said other part of the compliant device and spaced from said curved reflector for receiving the reflected radiation from said radiation source means, and generating output representative of the displacement of the movable part of the compliant device relative to the fixed part.

20. A non-contact displacement sensing system for a remote center compliance (RCC) device having a movable part and a fixed part comprising:
a curved reflector mounted for movement with the movable part of the RCC device;
radiation source means including at least one radiation source mounted to the fixed part of the RCC device and spaced from said curved reflector for providing a beam of radiation to said reflector; and
detector means including at least one detector device mounted to the fixed part of the RCC device and spaced from said curved reflector for receiving the reflected radiation from said radiation source means, and generating output representative of the displacement of the movable part of the RCC device relative to the fixed part.

21. A non-contact displacement sensing system for a remote center compliance (RCC) device having a movable part and a fixed part comprising:
a curved reflector mounted for movement with the fixed part of the RCC device;
radiation source means including at least one radiation source mounted to the movable part of the RCC device and spaced from said curved reflector for providing a beam of radiation to said reflector; and
detector means including at least one detector device mounted to the movable part of the RCC device and spaced from said curved reflector for receiving the reflected radiation from said radiation source means, and generating output representative of the displacement of the movable part of the RCC device relative to the fixed part.

* * * * *